Figure 1:
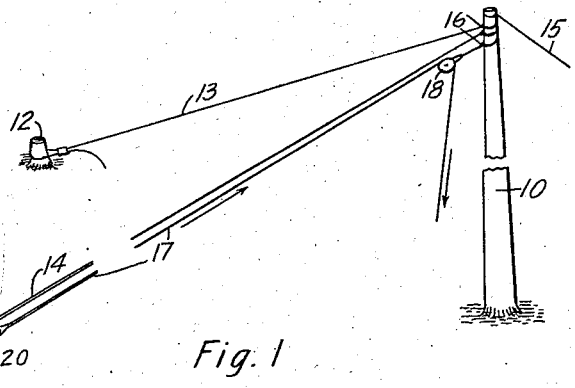

Dec. 21, 1926.

M. A. WEST 1,611,296

GUY LINE CLAMP

Filed Feb. 4, 1926

Inventor
M. A. West

By _____
Attorney

Patented Dec. 21, 1926.

1,611,296

UNITED STATES PATENT OFFICE.

MAXWELL A. WEST, OF PORTLAND, OREGON.

GUY-LINE CLAMP.

Application filed February 4, 1926. Serial No. 85,914.

This invention relates generally to clamps for lines by means of which their ends may be joined together, or the end of a guy line may be passed around an anchor and secured to the standing portion of the line. Specifically it pertains to a special form of guy line clamp in which a wedging action is employed to clamp the line in rigid relation; and particularly that type of wedging clamp devices in which the wedge does not contact with the line at any time and operates between a pair of laterally sliding jaws which themselves are adapted to engage the inner sides of the line, while the outer portions thereof are held by a stationary clamp.

An illustration of this style of clamp may be seen in my United States Patent Number 1,563,603, dated December 1, 1925, over which this device is an improvement.

The first object of this invention is to provide an exceedingly simple and efficient clamp for cables and ropes in which the clamp can be applied or released with a minimum amount of expenditure of time, labor or power and without undue injury to the lines or equipment, or danger to life and limb.

The second object is to so construct the clamp that one man with a sledge hammer can easily set the clamp to withstand the maximum strain to which it should be subjected, or he can release the clamp under such strains, or from a slack line, as gradually as desired without requiring the assistance of a pull from a power unit or otherwise maneuvering the rigging.

The third object is to so construct the clamp that its entire top side is left open at all times and that the tightening wedge can be started into the breach and held in position ready to be driven home by the sledge when the desired tension is attained on the guy line, and also that the wedge may be stopped at the desired point and secured in place without over-doing or under-doing the clamping action on the line.

The fourth object is to so construct the clamp that there is no wrong way in which it can be placed in position, and also that the wedge may be inserted from either end to facilitate the driving operation, as well as to assist in preventing the wedge from falling out while the guy line is being tightened. This is accomplished by making the sides of the clamp parallel instead of converging, as is commonly the case.

The fifth object is to so construct the clamping jaws that each may have a slight amount of longitudinal movement—that is, parallel with the line which they engage—in order that they may properly set themselves on the surface of the line.

The sixth object is to so construct the clamp that it can be manufactured by either casting or drop forging process and that its weight will be reduced to an extent which will not be objectionable.

Figure 2:
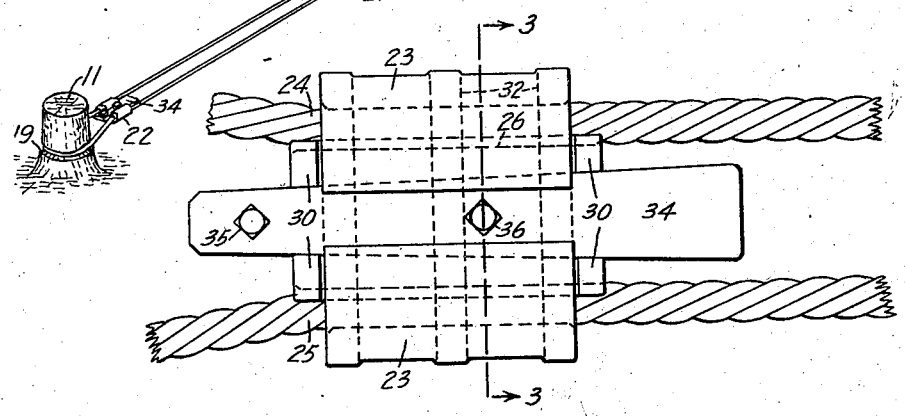
Figure 3:
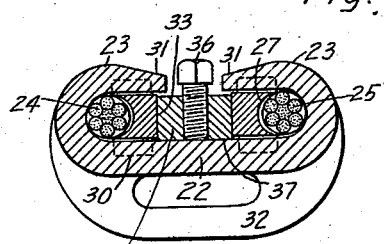
Figures 4, 5:
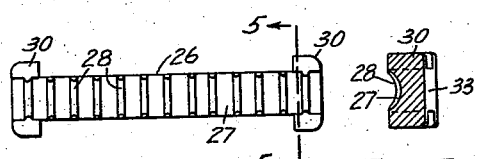
Figure 9:
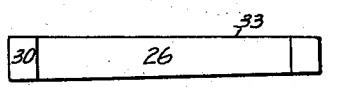
Figure 8:
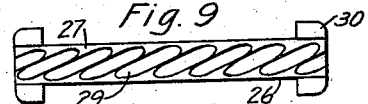
Figure 6:
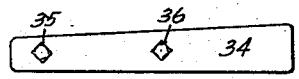
Figure 7:
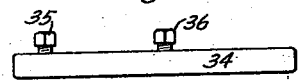

These results are accomplished in the manner set forth in the following specification as illustrated in the accompanying drawing, in which:

Figure 1 is a perspective view showing a spar tree such as is commonly employed in logging operations being guyed to outlying stumps. Figure 2 is an enlarged plan of the clamp from its open side and showing the wedge partially driven home. Figure 3 is a transverse section taken along the line 3—3 in Figure 2. Figure 4 is a side elevation through a form of the clamp especially adapted for use with manila rope. Figure 5 is a section taken along the line 5—5 in Figure 4. Figure 6 is a plan of the wedge. Figure 7 is a side elevation of the wedge. Figure 8 is a side elevation of a form of clamp having spiral line-engaging grooves, which are preferred for metallic cables. Figure 9 is a plan of Figure 8.

Similar numbers of reference refer to the same parts throughout the several views.

Referring in detail to the drawing, in order to illustrate the operation and utility of this device there is shown a spar tree 10 being guyed to outlying stumps 11 and 12 by means of the guy lines 13 and 14. Other guy lines 15 are also indicated leading from the top of the spar tree 10.

As is well understood, each guy line is provided with a special form of hook 16 which is passed around the top of the spar 10 once and then hooked on to the bight of the line, which permits it to cinch up tight on the spar and prevents the guy from slipping down. For very tall spar trees a second set of guys is often applied at an intermediate point on the spar to prevent same from bowing under load. In practice, usually six guys are provided at the top of the spar and four at the midway section, making ten guys in all. It is therefore apparent that whatever method is employed for tightening or anchoring these guy lines it must be simple, safe, easily handled and, above all, not require unusual skill for successful operation.

The hauling line 17, which is usually handled by a power driven drum (not shown), passes through the block 18 which is secured to the spar below the guy line fastenings by means of a short cable which will let the block stand out about three feet from the spar to facilitate leading off in different directions.

It is customary to notch a ring 19 half around the anchor stump to receive the guy line. The hauling line 17 terminates at a hook 20 which engages the eye 21 at the end of the guy line, which has been previously passed around the stump 11.

Referring more particularly to the clamp itself it will be seen to consist of a somewhat flat outer clamping member 22 having inturned edges 23 inside of which may be placed the portions 24 and 25 of the guy lines 14. Against each portion 24 and 25 is slidably placed a clamping jaw 26 provided on their line-engaging sides with a curved face 27 suitably roughened to insure proper contact with the line.

For manila rope it is preferred to employ the ribs 28; while for metallic cables the spiral grooves 29 seem preferable.

At each end of each clamp 22 is formed a T head 30 adapted to prevent the clamp from moving longitudinally through the cable for any great distance, due to the fact that the T heads will engage the ends of the clamp 22.

It must be observed here that some considerable clearance is desirable between the T ends and the clamp in order that the clamping jaw may properly seat itself on the rough cable surface.

The tips 31 of the inturned edges 23 do not touch but are open for admitting the line parts 24 and 25 prior to attaching the hauling line, as well as for the insertion of the jaws 26, and later for their removal. On the back of the clamp 22 are formed the stiffening ribs 32 which are preferably in the form of handles adapted to strengthen the clamp and aid in handling, either by hand or, if it is desired, to string a number of the devices on a cable and drag same through the woods as is customary with such devices.

Another advantage of having the handles on the under side of the device is to make same more stable prior to the tension on the guy line.

The members 26, it will be observed, taper longitudinally and are themselves in wedge form and their sides 33 engage the wedge 34 which is considerably longer than the clamp itself, in order to give a greater working range for the wedge without requiring too steep an angle therefor. The wedge 34 is provided with set screws 35 and 36, either one of which can be seated against the inner side 37 of the clamp 22. Obviously, holes could be drilled through the wedge 34 and the clamp 22, as is illustrated in my above-mentioned patent, but by the employment of the set screws 35 and 36 any desired setting of the wedge may be obtained. In other words, it may be locked at exactly the position where it is thought that the clamp is properly set, instead of being necessary to stop at a certain hole before the clamp is fully set, or to require the additional driving of the wedge in order to register the next hole. Furthermore, in the employment of pins there is constant danger of loss and getting out of order, owing to the unusually rough treatment such devices are subjected to in the woods.

The operation of the device is as follows: Assuming that it is to be used for fastening guy lines to anchor stumps, the guy line is first fastened to the spar tree and then passed around the anchor stump. The clamp 22 is now placed on the ground in front of the stump and the two portions 24 and 25 of the guy line are laid into the clamp. The clamping jaws 26 are now put into place against the inner sides of the line and the wedge 34 is started between the two jaws 26 and the first set screw 35 is tightened to prevent same from falling out.

The hauling line 17 is now made fast to the end of the guy line and, by means of said hauling line, the guy line 14 is pulled through the clamp and around the stump until the desired tension is attained. At this point the first set screw 35 is loosened and the wedge is driven home until the jaws 26 exert sufficient pressure against the cable to prevent any slippage therethrough after the tension from the hauling line is released or under pulls in the opposite direction from other guy lines, or under working conditions.

By attaching the block 18 well up on the spar and causing the pull of the hauling line to be practically parallel to the guy itself a very desirable result is obtained, inasmuch as additional purchase is secured thereby over what would be the case, for example, if the block 18 were fastened at the foot of the spar. As it is, the spar top and stump are being pulled toward each other.

As happens in many instances, the guy lines may be left on a spar tree after the donkey engine has been removed from the immediate vicinity and it is not possible to use same for assistance in this work. With my device, however, no such outside assistance is required. All that is necessary is to loosen the set screws 35 or 36 and gradually drive the wedge 34 from between the jaws 26. If the tension on the guy line is great, this operation should be correspondingly slow, and the release of the guy line can be so gradual that no possible injury can occur to anyone when the tension is finally released altogether.

I am aware that many forms of guy line clamps have been constructed in the past: it is therefore not my intention to cover such devices broadly, but I do intend to cover all such forms and modifications thereof as fall fairly within the appended claims.

I claim:

1. A guy line clamp having, in combination, an open sided outer frame member having parallel opposed side grooves formed therein for receiving portions of cable; clamp jaws capable of limited longitudinal movement adapted to be placed against cable in said grooves, said jaws having their adjacent sides converging; a wedge for driving said clamp jaws outwardly against said cable; and means for locking said wedge in a clamped position.

2. In a guy line clamp, the combination of a flat outer clamp member having inturned parallel edges forming opposed cable receiving grooves along the sides of said clamp and in parallel relation to each other; two wedge shaped clamp jaws each having one grooved side adapted to engage a cable in one of said grooves, and having their adjacent sides converging; a wedge adapted to be driven between said jaws; means for limiting the longitudinal movement of said jaws; and means for locking said wedges to said clamp member when the clamping operation is completed.

3. In a guy line clamp, the combination of a clamp frame having parallel opposed grooves formed along the sides thereof; a pair of wedge-shaped clamp jaws adapted to engage the inner sides of portions of cable within said grooves, each of said clamp jaws having means for permitting only a limited endwise movement; a wedge adapted to be driven between said clamp jaws; and means for locking said wedge in any desired position.

4. In a guy line clamp, the combination of a clamp frame consisting of a relatively flat member having inturned parallel edges each of which can receive a portion of cable and hold same against outward thrust and in a parallel relation to the cable on the opposite side of said clamp; a tapering clamp jaw in each inturned portion of the clamp having a grooved side turned toward its cable, the adjacent side of the opposite clamps converging each of said clamps having a T-shaped end providing limited longitudinal movement; and a wedge adapted to be driven between said jaws, said wedge having set screw means for holding same against longitudinal movement when desired.

5. A guy line clamp having, in combination, a flat frame member having inturned edges formed at each top side thereof and having a plurality of ribs on the under side of the back thereof a space being left between the inturned ends of said clamp sufficient for the free passage of cable into or out of said clamp, one of the inturned edges receiving the bight of a line and the opposite edge receiving the hauling end thereof; a clamp jaw in each inturned edge having its outer side grooved to conform with the contour of the cable and its inner side converging with that of the opposite jaw, each of said jaws having stop lugs formed on the end thereof adapted to engage the ends of said frame; and a wedge adapted to be driven between the converging faces of said jaws and force same outwardly with their grooved faces parallel to each other until they sufficiently engage the cables in said inturned grooves to prevent endwise movement of said cables with relation to each other.

MAXWELL A. WEST.